(12) United States Patent
Jentzsch (10) Patent No.: US 7,210,661 B1
(45) Date of Patent: May 1, 2007

(54) MOTOR INSTALLATION SYSTEM

(75) Inventor: Christopher L. Jentzsch, Snellville, GA (US)

(73) Assignee: Heatcraft Refrigeration Products, LLC, Stone Mountain, GA (US)

( * ) Notice: Subject to any disclaimer, the term of this patent is extended or adjusted under 35 U.S.C. 154(b) by 75 days.

(21) Appl. No.: 11/250,261

(22) Filed: Oct. 14, 2005

(51) Int. Cl.
*A47B 96/06* (2006.01)
(52) U.S. Cl. .................... 248/220.41; 248/674
(58) Field of Classification Search ............. 248/309.1, 248/310, 316.8, 220.41, 220.43, 221.12, 248/222.14, 222.31, 222.41, 674
See application file for complete search history.

(56) References Cited

U.S. PATENT DOCUMENTS 4,681,233 A * 7/1987 Roth ....................... 211/70.6
6,019,328 A * 2/2000 Allen ..................... 248/220.31

* cited by examiner

*Primary Examiner*—Ramon O Ramirez (57) ABSTRACT

An installation system for use with a motor comprising a motor base coupled to the motor and having a first aperture through the motor base, and a first post coupled to a support structure and configured to cooperate with the first aperture, wherein the first post is configured to temporarily support the motor while the motor is removably coupled to the support structure. The present invention also provides a method of manufacturing the motor installation system.

20 Claims, 7 Drawing Sheets

MOTOR INSTALLATION SYSTEM

TECHNICAL FIELD OF THE INVENTION

The present invention is directed, in general, to a system for attaching a motor to a support structure and, more specifically to a system for initially locating and supporting a motor on a support beam so that the installer has both hands free to fasten mounting/adjustment bolts and nuts.

BACKGROUND OF THE INVENTION

Electric motors are used in many applications to drive machinery or other devices. It is not uncommon to encounter heavy electric motors that, in order to install them, require the installer to support the motor in approximately the final location while mounting bolts are inserted through slots in a motor mount base and into or through a mounting structure which is part of a motor-driven device, e.g., air conditioning unit. Securing nuts are then coupled to the mounting bolts, the mounting bolts and nuts tightened to the point that motor alignment to the driven machinery can be accomplished and then the nuts are tightened to securely hold the motor in place. Frequently these motors, such as for powering large air conditioner installations, are quite heavy, requiring the installer to use both hands to position the motor and to perform a "juggling act" to insert the bolts and attach the nuts. Failure of the motor necessitates a similar juggling act to dismount the motor and to install a new one. Losing a grip on a heavy motor can be both painful and dangerous.

Accordingly, what is needed in the art is a motor mounting system that does not suffer the shortcomings of the prior art and frees the hands of the installer from the weight of the motor when inserting and coupling the mounting bolts and nuts, while still allowing for final alignment of the motor with the driven machinery.

SUMMARY OF THE INVENTION

To address the above-discussed deficiencies of the prior art, the present invention provides an installation system for use with a motor comprising: a motor base coupled to the motor and having a first aperture through the motor base, and a first post coupled to a support structure and configured to cooperate with the first aperture, wherein the first post is configured to temporarily support the motor while the motor is removably coupled to the support structure. The present invention also provides a method of manufacturing the motor installation system.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

Figures 1A, 1B:
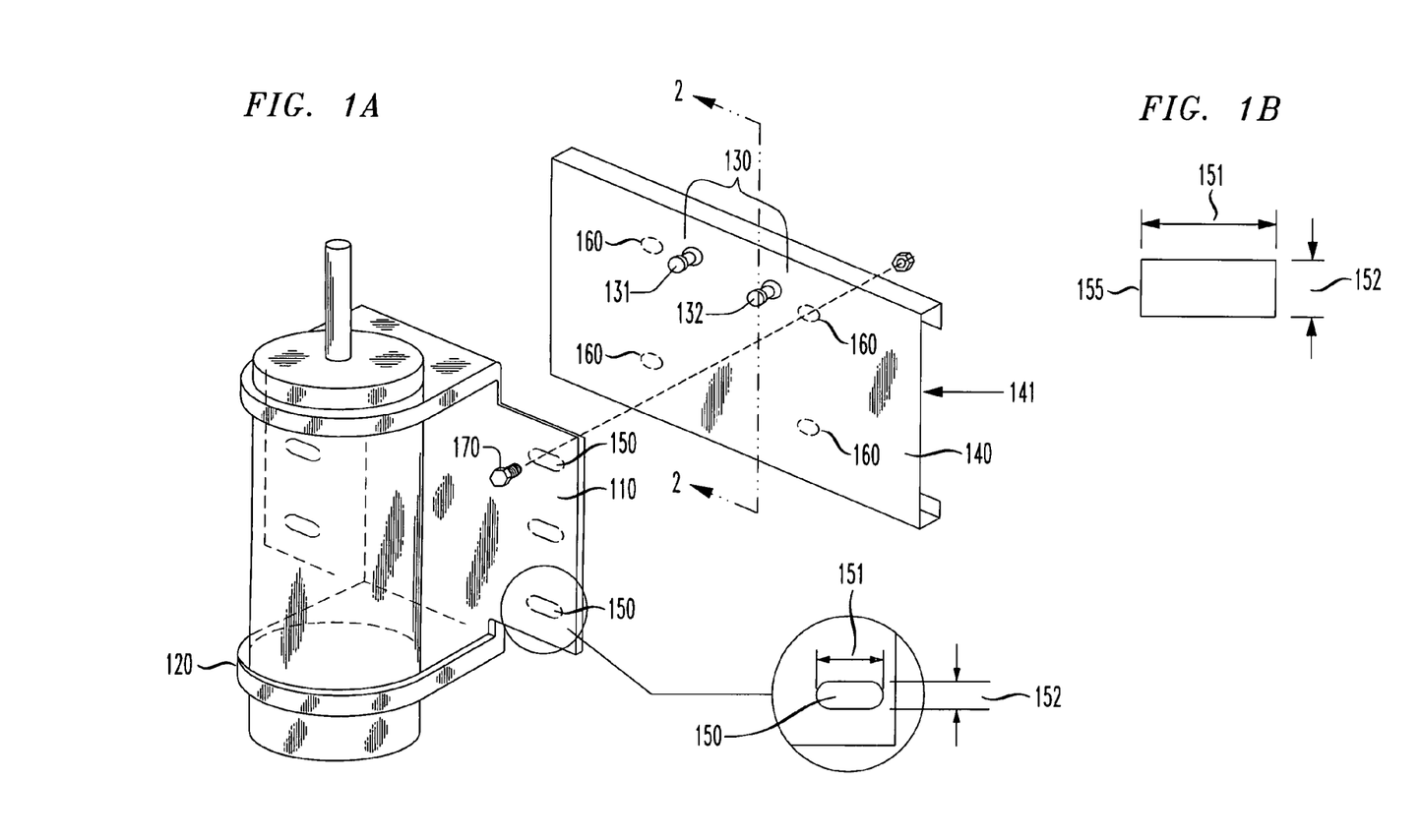
FIG. 1A illustrates an isometric view of one embodiment of a motor installation system constructed according to the principles of the present invention.
FIG. 1B illustrates a plan view of an alternative embodiment of the elongated apertures of FIG. 1A.

Referring initially to FIGS. 1A and 1B, illustrated is an isometric view of one embodiment of a motor installation system 100 constructed according to the principles of the present invention. The motor installation system 100 comprises a motor base 110 coupled to a motor 120, and first and second posts 131, 132, (collectively: posts 130), coupled to a support structure 140. The motor base 110 may be coupled to the motor 120 by any conventional means, i.e., welding, strapping, keying, etc. In a preferred embodiment, the motor base 110 may be a conventional motor base having a plurality of elongated apertures 150, each elongated aperture 150 having an aperture length 151 and an aperture width 152. The elongated apertures 150 may have a flattened oval shape, i.e., racetrack, or a rectangular shape 155 as shown in FIG. 1B. For the purposes of this discussion, the support structure 140 may be the frame of an air conditioning unit (not shown) or other electric motor-powered device. One who is of skill in the art will readily list a significant number of other electric motor-powered devices that would benefit from the present invention. In a preferred embodiment, the elongated apertures 150 allow some vertical and lateral adjustment of the position of the motor 120 with respect to the support structure for aligning a drive belt (not shown) to the driven assembly. The support structure 140 further comprises mounting bolt apertures 160 therethrough. In one embodiment, the mounting bolt apertures 160 are unthreaded to receive mounting bolts 170 therethrough and to be fastened to nuts 171. In an alternative embodiment, the mounting bolt apertures 160 are internally threaded to receive and cooperate with the mounting bolts 170. In yet another embodiment, the mounting bolt apertures 160 have locknuts affixed, e.g., by welding, on a rear face 141 of the support structure 140. One who is of skill in the art will conceive of other suitable bolt/nut fastener systems for mounting the motor 120.

Figure 2A:
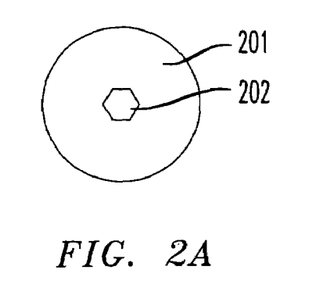
FIG. 2A illustrates an end view of one embodiment, having a circular cross section, of the posts of FIG. 1A.
Figure 2B:
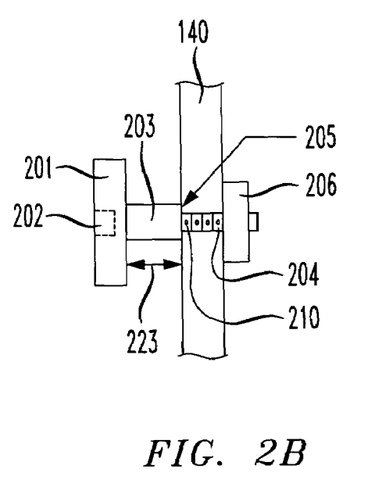
FIG. 2B illustrates a partial sectional view, along a plane 2—2 of FIG. 1A, of one embodiment of a post installed in the support structure.
Figure 2C:
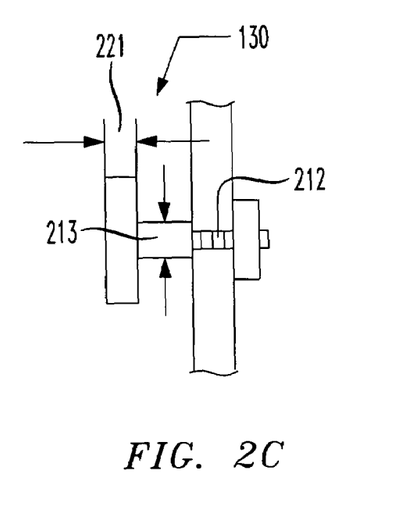
FIG. 2C illustrates a partial sectional view, along a plane 2—2 of FIG. 1A, of a second embodiment of a post installed in the support structure.
Figure 2D:
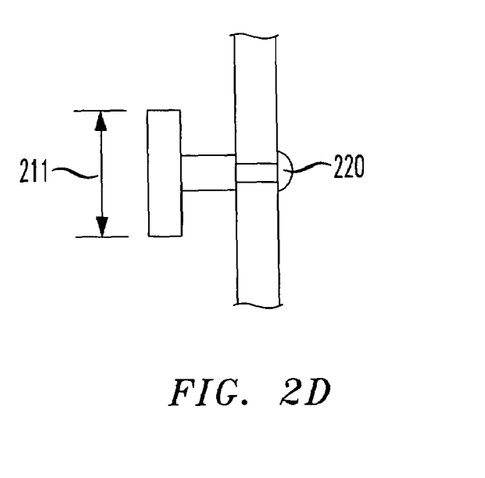
FIG. 2D illustrates a partial sectional view, along a plane 2—2 of FIG. 1A, of a third embodiment of a post installed in the support structure.
Figure 2E:
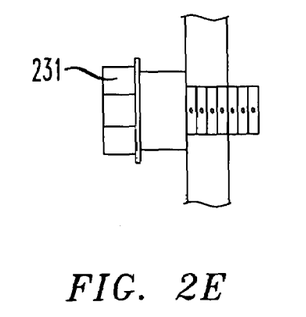
FIG. 2E illustrates a profile view, of a fourth embodiment of a post having a flange head.

Refer now to FIGS. 2A through 2E. FIG. 2A illustrates an end view of one embodiment, having a circular cross section, of the posts 130 of FIG. 1A. FIGS. 2B, 2C and 2D are partial sectional views of three alternative embodiments of posts 130 installed in the support structure 140 along a plane 2—2 of FIG. 1A. In a preferred embodiment the posts 130 may be shoulder screws 130 as in FIGS. 2A, 2B, 2C and 2E. The posts 130 comprise a circular head 201 having an optional recessed socket 202 therein (FIGS. 2A and 2B), a body 203, a threaded portion 204 and a shoulder 205. The shoulder screw 130 is so-called because of having the shoulder 205 that prevents the body 203 from passing through a properly size unthreaded aperture 210 in the support structure 140. FIG. 2C is that of a shoulder screw threaded directly into the support structure 140. In this embodiment, the shoulder screw may be mated with a threaded aperture in the support structure 140. In an alternative of this embodiment, the shoulder screw may be a self-threading screw for coupling directly into an un-threaded aperture in the support structure 140. FIG. 2D illustrates a third embodiment that may be fashioned from a suitable material, e.g., machine steel, and then welded or riveted 220 in place. Alternatively, FIG. 2E illustrates a shoulder screw 130 having a flanged head 231 suitable to be driven with a conventional hex socket or similar tool.

In a preferred embodiment, the recessed socket 202 is configured to accept a hex key, often called by its original name: an Allen wrench, which was a trademark of the Allen Manufacturing Company of Hartford, Conn. The recessed socket 202 in combination with a hex key can screw the shoulder screw 130 into a threaded aperture 212 or alternatively hold the shoulder screw 130 in place while a nut 206 is affixed and tightened to the threaded portion 204. The head 201 has a head diameter 211 while the body 203 has a body diameter 213 that is less than the head diameter 211.

Figure 3:
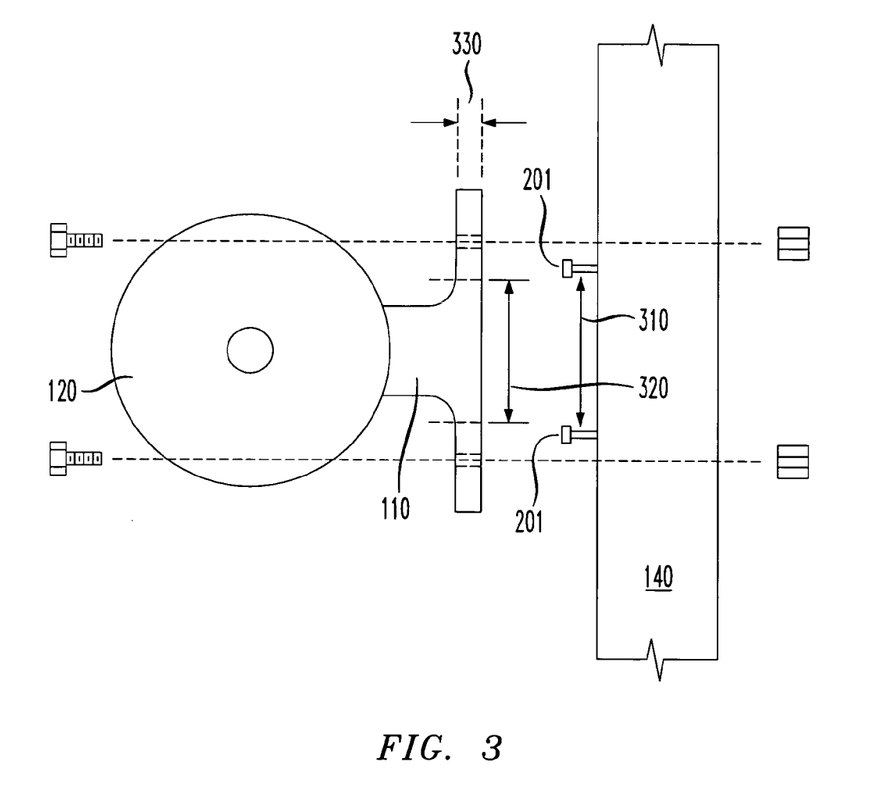
FIG. 3 illustrates an exploded top plan view of the motor installation system of FIG. 1A just prior to placement of the motor with base on the posts.

Referring now to FIG. 3, illustrated is an exploded top plan view of the motor installation system 100 of FIG. 1A just prior to placement of the motor 120 with base 110 on the posts 130. While the present discussion is directed toward the installation of a vertical-shaft motor, one who is of skill in the art will recognize that horizontal or even off-angle installations may likewise readily use the present invention. The posts 130 are separated along the support structure 140 by an inter-postal distance 310 measured between proximate edges of the two postal heads 201. This inter-postal distance 310 is slightly greater than an inter-aperture distance 320 measured between the proximate edges of the two elongated apertures 150. The head diameter 211 is slightly less than the aperture width 152. This relationship of the inter-postal distance 310 and the inter-aperture distance 320, together with the head diameter 211 being slightly less than the aperture width 152, allows the motor base 110 to readily slip over the posts 130. Furthermore, the body length 223 of the posts 130 is slightly greater than a base thickness 330 at the apertures 150. This relationship of the body length 223 and the base thickness 330 allows the motor base 110 to easily slip over the heads 201 of the posts 130 and then rest on the bodies 203 of the posts 130. The head thickness 221 and the body diameter 213 must be sufficient to hold, at least temporarily, the weight of the motor 120 and the motor base 110 during installation.

Figure 4:
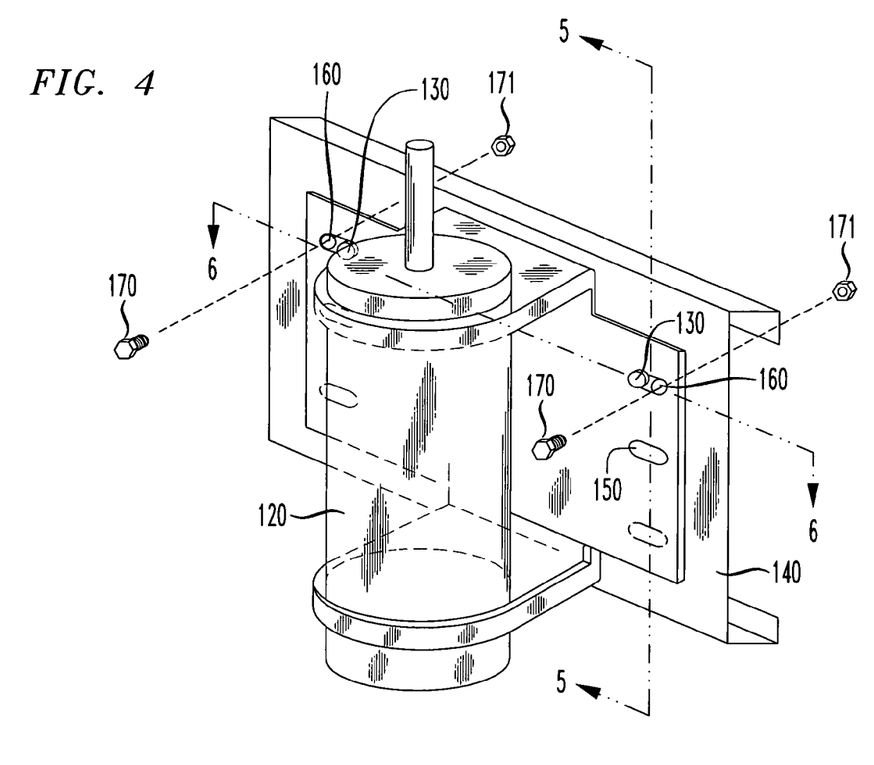
FIG. 4 illustrates an isometric, partial cutaway, view of the motor and motor base installed on the posts.

Referring now to FIG. 4, illustrated is an isometric, partial cutaway, view of the motor 120 and motor base 110 installed on the posts 130. Bolts 170 are aligned for installation through elongated apertures 150 and into mounting bolt apertures 160. When the motor base 110 has been placed upon the posts 130, the posts 130 temporarily support all of the weight of the motor 120 and motor base 110 while the installer obtains the mounting bolts 170 and mounting nuts 171. With the motor base 110 on the posts 130, the first and second apertures substantially align with the mounting bolt apertures 160, respectively.

Figure 5:
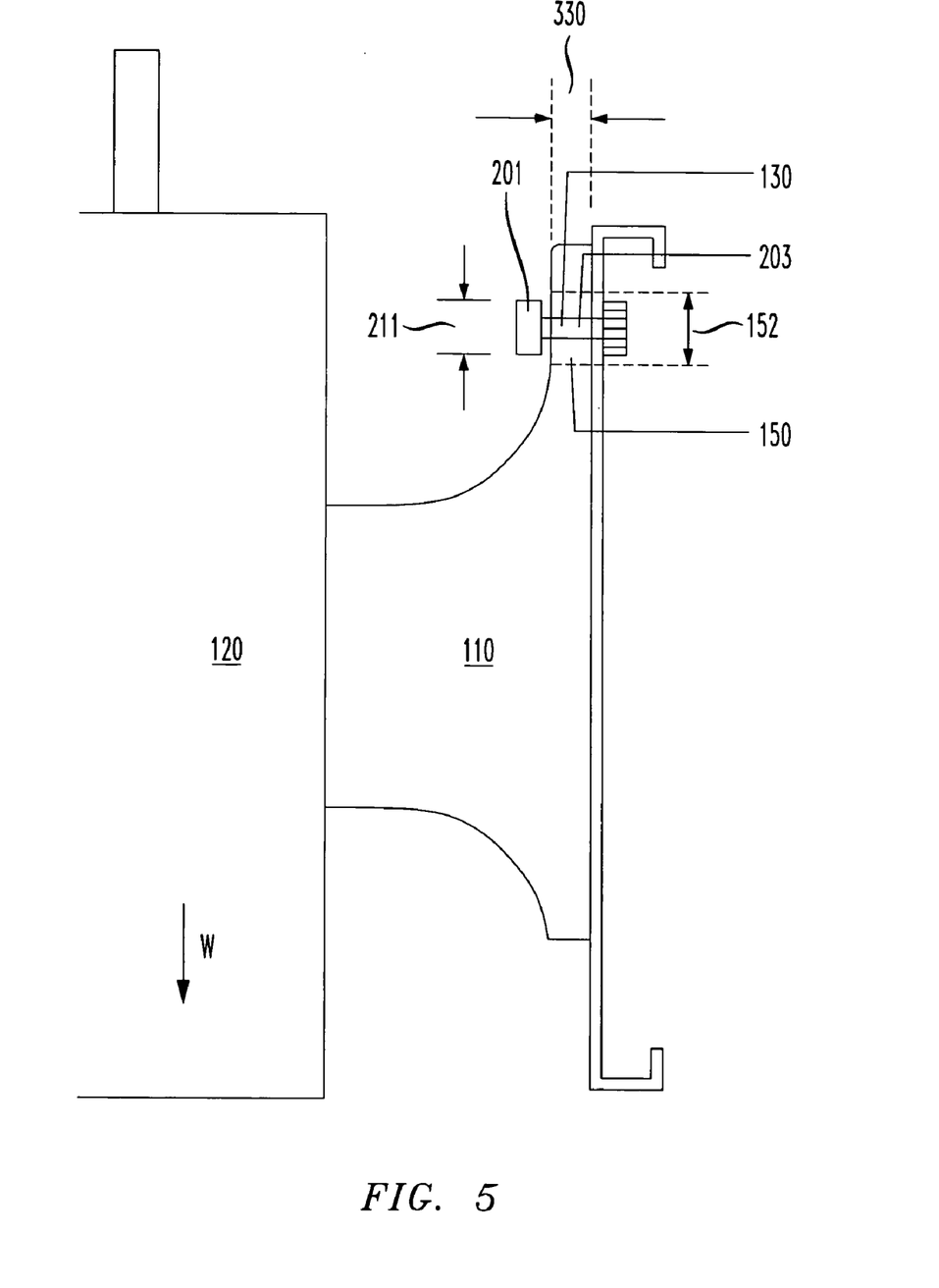
FIG. 5 illustrates a partial sectional view of the motor and motor base along plane 5—5 of FIG. 4.

Referring now to FIG. 5, illustrated is a partial sectional view of the motor 120 and motor base 110 along plane 5—5 of FIG. 4. The plane 5—5 of the section passes vertically through one of the posts 130 and one of the elongated apertures 150. As can be seen, the post head diameter 211 is slightly smaller than the aperture width 152, thereby allowing the post head 201 to pass therethrough. In FIG. 5, the weight W of the motor 120 and motor base 110 are supported on the body 203 of the posts 130. The post heads 201 prevent the motor 120 from falling off of the posts 130. The base thickness 330 is less than the length 223 of the post body 203. The posts 130 keep the motor 120 approximately positioned with respect to the intended driven machinery, e.g., fan blade (not shown).

Figure 6:
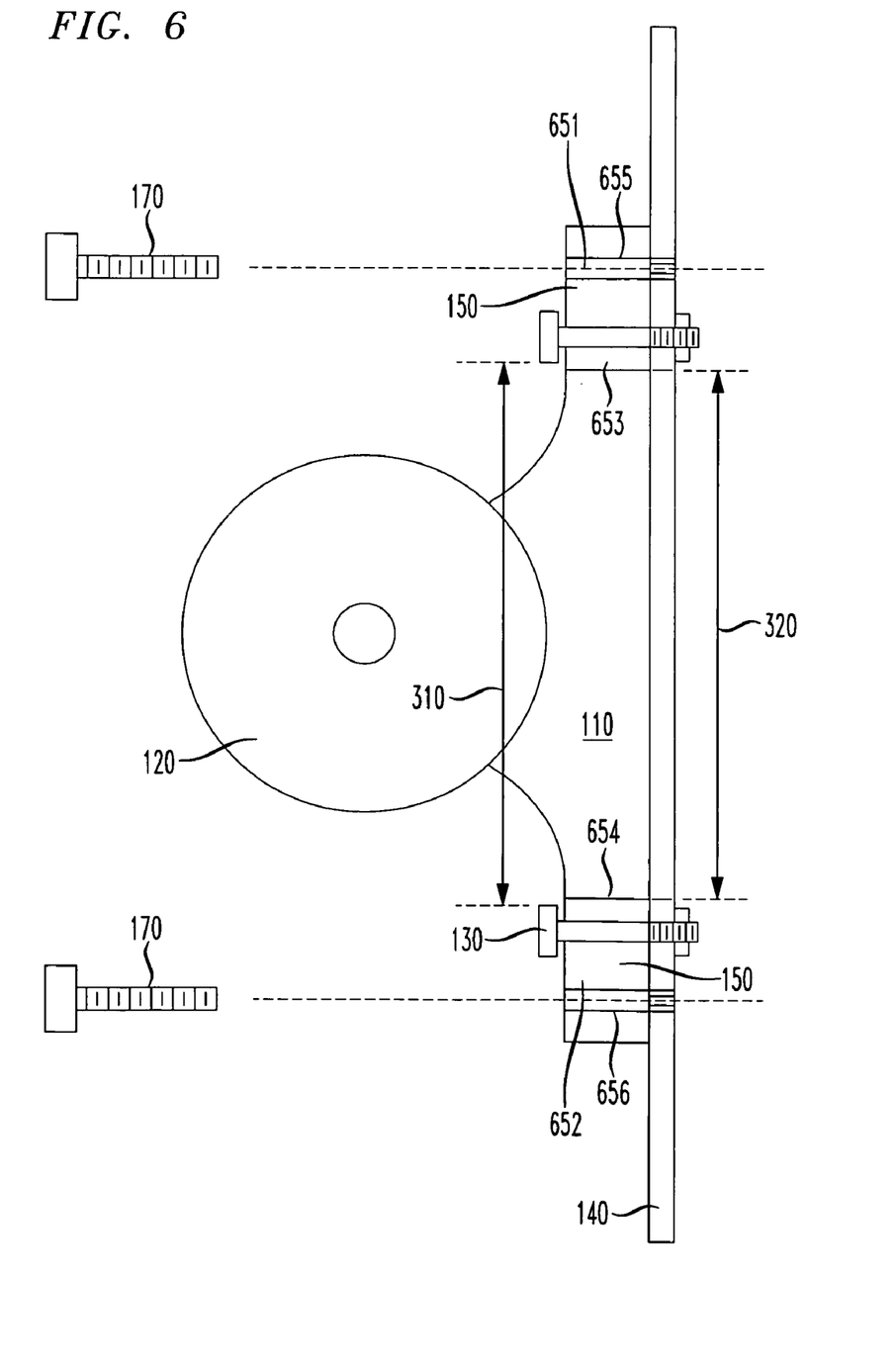
FIG. 6 illustrates a partial sectional view of the motor base and support structure along plane 6—6 of FIG. 4.

Referring now to FIG. 6, illustrated is a partial sectional view of the motor base 110 and support structure 140 along plane 6—6 of FIG. 4. The plane 6—6 of the section passes horizontally through the posts 130 and the elongated apertures 150. Paired elongated apertures 651, 652 have closest ends 653, 654, respectively and distal ends 655, 656, respectively. The inter-aperture distance 320 between the closest ends 653, 654 is slightly less than the inter-post distance 310, allowing the motor base 110 to be placed over the posts 130. The posts 130 are located proximate the closest ends 653, 654 of the paired elongated apertures 651, 652. The distal ends 655, 656 of the paired elongated apertures 651, 652 are therefore available to allow the mounting bolts 170 to pass therethrough.

Figure 7:
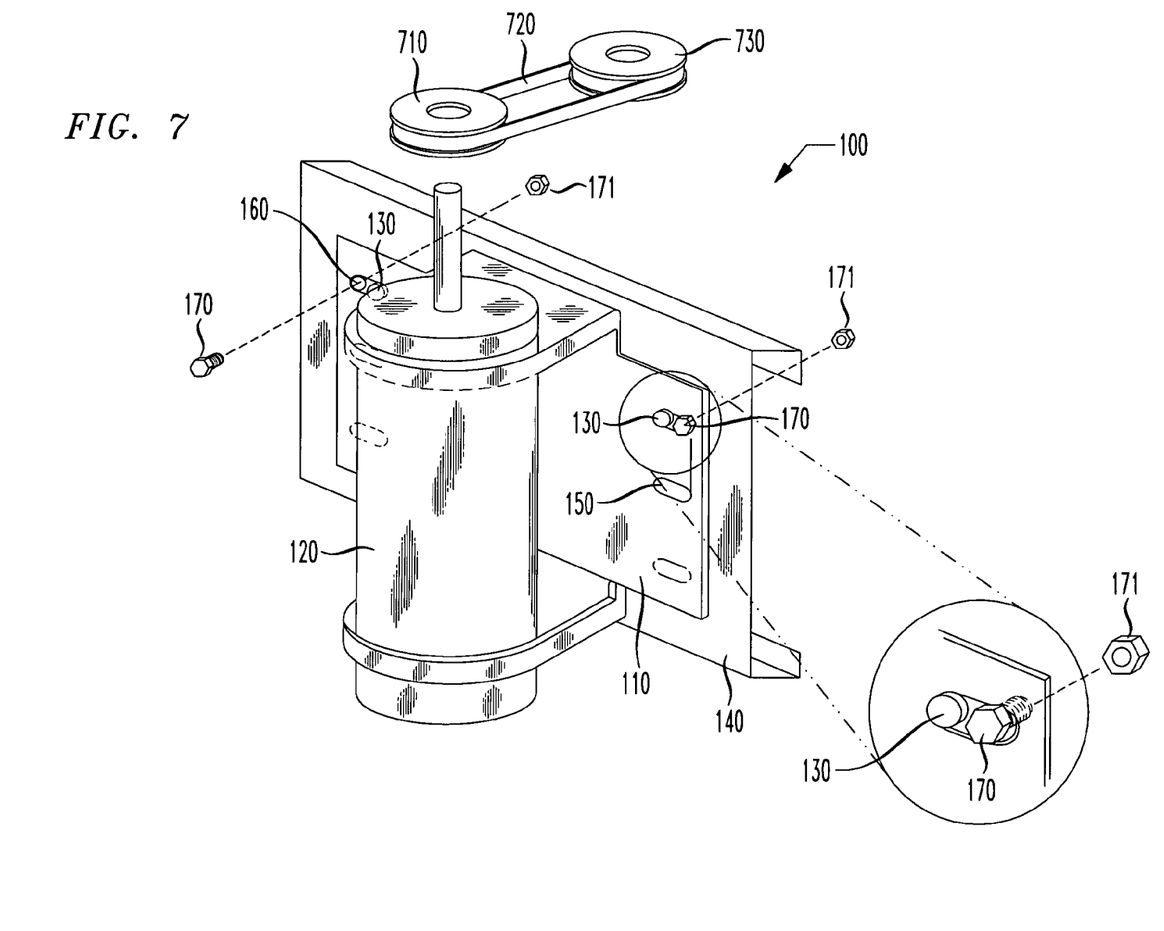
FIG. 7 illustrates an isometric view of the motor and motor base installed on the support structure.

Referring now to FIG. 7, illustrated is an isometric view of the motor 120 and motor base 110 installed on the support structure 140. Once the mounting bolts 170 and nuts 171 have been coupled, the nuts 171 may be tightened to the point that the motor base 110 may be slid so as to align motor pulley 710 and drive belt 720 with a pulley 730 coupled to the driven machinery, e.g., a fan blade (not shown). One who is of skill in the art will understand how this is accomplished. When the motor pulley 710, drive belt 720 and are properly aligned, mounting bolts 170 and nuts 171 are tightened so that a substantial portion of the weight W of the motor 120 and motor base 110 is carried by the mounting bolts 170 and nuts 171 through to the supporting structure 140. The posts 130 may, in the course of aligning the pulleys 710, 730 and drive belt 720, contact a portion of the elongated apertures 150, but any portion of the weight W of the motor 120 and motor base 110 carried by the post(s) 130 is inconsequential to the substantial portion of the weight W carried by the mounting bolts 170 and nuts 171. One who is of skill in the art will understand that the posts 130 of the system 100 will likewise assist a repairman when removing the motor 120 and motor base 110.

One who is of skill in the art will recognize that flat washers, lock washers, lock nuts, flange nuts and other similar hardware may be effectively used, as necessary, with both the posts 130 and the mounting bolts 170.

Thus, a motor mounting system for use with a motor has been described that enables an installer to temporarily position a heavy motor while obtaining and installing mounting bolts and nuts that will ultimately bear the most significant portion of the weight of the motor. Although the present invention has been described in detail, those skilled in the art should understand that they can make various changes, substitutions and alterations herein without departing from the spirit and scope of the invention in its broadest form.

What is claimed is:

1. For use with a motor, an installation system, comprising:
   a motor base coupled to a motor, said motor base having a first aperture therethrough; and
   a first post coupled to a support structure and configured to cooperate with said first aperture, said first post configured to temporarily support said motor while said motor is removably coupled to said support structure.

2. The installation system as recited in claim 1 wherein said first aperture has a racetrack shape or a rectangular shape and having a length and a width.

3. The installation system as recited in claim 2 wherein said first post has a body portion and a head portion, said head portion having a head diameter less than said first aperture width.

4. The installation system as recited in claim 3 wherein said head portion has a circular cross section.

5. The installation system as recited in claim 3 wherein said body portion has a body diameter less than said head diameter.

6. The installation system as recited in claim 3 wherein said body portion has a body length and said motor base has a base thickness and wherein said body length is longer than said base thickness.

7. The installation system as recited in claim 1 wherein said support structure has a mounting bolt aperture therethrough and wherein said first aperture substantially aligns with said mounting bolt aperture when said first post cooperates with said first aperture.

8. The installation system as recited in claim 7 further comprising a mounting bolt extending through said first aperture and said mounting bolt aperture to receive a mounting nut thereon, said mounting bolt supporting a substantial weight of said motor base and said motor on said support structure when said mounting nut is securely coupled to said mounting bolt.

9. The installation system as recited in claim 1 wherein said motor base has a second aperture therethrough and said support structure has a second post thereon configured to cooperate with said second aperture, said first and second posts configured to temporarily support said motor while said motor is removably coupled to said support structure.

10. The installation system as recited in claim 1 wherein said first post is a shoulder screw.

11. A method of manufacturing an installation system for use with a motor, comprising:
   coupling a motor base to a motor, said motor base having a first aperture formed therethrough; and
   coupling a first post to a support structure, said first post configured to cooperate with said first aperture, said first post configured to temporarily support said motor while said motor is removably coupled to said support structure.

12. The method as recited in claim 11 wherein said first aperture is formed in a racetrack shape or a rectangular shape and having a length and a width.

13. The method as recited in claim 12 wherein coupling a first post includes coupling a first post having a body portion and a head portion, said head portion having a head diameter less than said first aperture width.

14. The method as recited in claim 13 wherein coupling a first post includes coupling a first post wherein said head portion has a circular cross section.

15. The method as recited in claim 13 wherein coupling a first post includes coupling a first post wherein said body portion has a body diameter less than said head diameter.

16. The method as recited in claim 13 wherein coupling a first post includes coupling a first post wherein said body portion has a body length and said motor base has a base thickness, and wherein said body length is longer than said base thickness.

17. The method as recited in claim 11 wherein coupling a first post includes coupling a first post wherein said support structure has a mounting bolt aperture therethrough and wherein said first aperture substantially aligns with said mounting bolt aperture when said first post cooperates with said first aperture.

18. The method as recited in claim 17 coupling a motor base includes coupling a motor base wherein said motor base is configured to accept a mounting bolt passed through said first aperture and said mounting bolt aperture to receive a mounting nut thereon, said mounting bolt supporting a substantial weight of said motor base and said motor on said support structure when said mounting nut is securely coupled to said mounting bolt.

19. The method as recited in claim 11 wherein said motor base has a second aperture therethrough and said support structure has a second post thereon configured to cooperate with said second aperture, said first and second posts configured to temporarily support said motor while said motor is removably coupled to said support structure.

20. The method as recited in claim 11 wherein coupling a first post includes coupling a first post that is a shoulder screw.

\* \* \* \* \*